May 20, 1924.
G. W. LOGGIE ET AL
1,494,691
COFFEE PERCOLATOR
Original Filed July 12, 1917
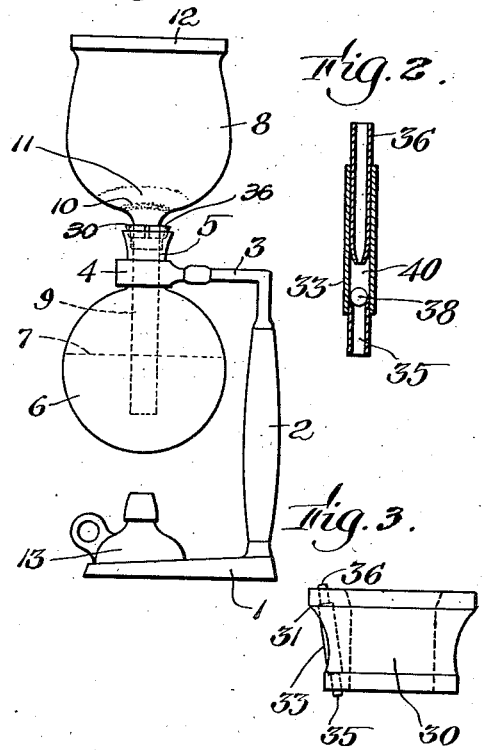
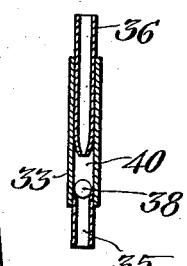
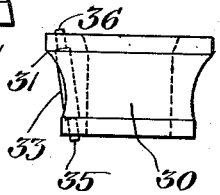
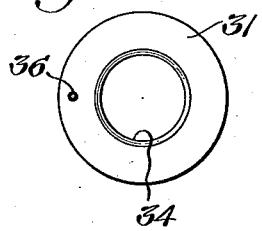
Inventors:
George W. Loggie,
William H. Lamb,
by James R. Hodder.
Attorney.

Patented May 20, 1924.

1,494,691

UNITED STATES PATENT OFFICE.

GEORGE W. LOGGIE, OF LEXINGTON, AND WILLIAM A. LAMB, OF EVERETT, MASSACHUSETTS, ASSIGNORS, BY MESNE ASSIGNMENTS, TO HAZEL M. BRIDGES, OF MALDEN, MASSACHUSETTS.

COFFEE PERCOLATOR.

Application filed July 12, 1917, Serial No. 180,095. Renewed October 5, 1923.

*To all whom it may concern:*

Be it known that we, GEORGE W. LOGGIE, of Lexington, in the county of Middlesex and State of Massachusetts, and WILLIAM A. LAMB, of Everett, in the county of Middlesex and State of Massachusetts, citizens of the United States, have invented an Improvement in Coffee Percolators, of which the following description, in connection with the accompanying drawings, is a specification, like letters on the drawings representing like parts.

Our present invention is an improved coffee percolator. Heretofore, in the construction of coffee percolators of the type to which the present invention relates, it has been customary to have the coffee receptacle and the water receptacle united by a substantially air-tight connecting means. The coffee receptacle being normally held above the water receptacle was detachably united thereto in a variety of ways, usually by a liquid- and air-tight rubber washer. Heat being supplied under the water receptacle, the temperature in the latter gradually increased until the expansion of the air forced the water upward into the coffee receptacle or until the operator opened a valve to lower the pressure of the air. Unless the pressure was lowered the coffee was flooded with water before such water reached the boiling temperature, and the water would tend to soak into the coffee beans and take up an abnormal amount of caffeine, such being undesirable.

Our present invention obviates entirely the difficulties and objections above noted and instead of relying on manually controlled means for lowering the pressure within the water receptacle we provide means allowing the air to escape and a partial escape of steam, until the water in the lower receptacle has attained and exceeded the boiling temperature, then relying upon the quicker expansion of the steam from boiling water to force the water upwardly, while boiling, into the coffee retaining receptacle, thus instantly flooding the ground coffee. This prevents any undue soaking or loading of the coffee liquid with caffeine and permits an almost instantaneous coffee making by boiling water, which may then be withdrawn into the lower receptacle by discontinuing the fire. Our process not only improves the quality of coffee made thereby, but also acts more quickly and saves considerable application of heat.

In carrying out our invention we preferably provide small valves, substantially as a check valve, which will operate to permit the escape of air and steam until the over supply of steam forces the boiling water up to the coffee, the check valve preventing the return of air to the lower receptacle.

An important feature of this invention consists in the possibility of eliminating entirely from a percolator of this type, all rubber, fiber or similar parts, which have been required in prior constructions in order to secure the air-tight connection between the water and coffee receptacles. We are enabled to utilize a metal or even a glass connection, because our percolator does not require to be air-tight. This is a very desirable feature, as it enables the entire percolator to be made of metal or glass, easily cleaned, and the same does not deteriorate although we use a rubber washer where a valve is employed.

While we have mentioned and explained the invention as applied to the making of coffee, it will be readily appreciated that the same may be employed with equal advantages in the making of tea or similar beverages.

Referring to the drawings illustrating several modifications of percolator for carrying out the invention, Fig. 1 is a side view of a coffee percolator of the well known and so-called "Silex" type;

Fig. 2 is a sectional elevation of the tube extending between the top and bottom members of the device;

Fig. 3 is a side elevation of the connecting means or washer interposed between the top and bottom members, and Fig. 4 is a plan view of Fig. 3.

Referring to the drawings this type of percolator may be advantageously embodied in a hand or table article, comprising a base 1, vertical handle 2 and a bracket 3 extending over the base 1 and having a holding portion 4, hinged or otherwise adapted to be opened and closed to clasp about the neck 5 of the water receptacle 6, in a well-known manner. The receptacle 6 is of metal, glass or the like, and is adapted to receive and contain a quantity of water, such for example as shown in dotted lines at 7, the water being poured into the open neck 5. Fitted into the receptacle 6 and through the neck 5 is the coffee receptacle 8 containing a small stem 9 extending downwardly into the receptacle 6 and below the level of the water 7. A perforated strainer 10 preferably of glass, but which may be of metal, or fabric, is fitted in the bottom of the coffee receptacle 8 and a suitable amount of coffee grounds poured therein, as indicated at 11, the receptacle 8 being then covered by the top 12.

Any suitable heater may be employed, electric, gas, or alcohol, the latter being indicated at 13.

By our invention we provide a suitable member or washer 30 of rubber, fibre or any suitable material, resting in the top of the neck 5 and through which the stem 9 extends. This member 30 is in the form of a sleeve or washer having an inner diameter 34 to correspond to the exterior diameter of the stem 9, permitting the stem to be lowered therethrough until the coffee receptacle 8 rests therein on the top. Through the washer 30 extends a positively acting valve comprising the portion 33, escape tube 36, lower portion 35, and a ball valve 38 working in a valve chamber 40. A plurality of these valves may, if desired, be positioned through the washer, one only being shown in Figs. 3 and 4, said valves being of sufficient length to project above the flange 31 of the washer at the top and below the washer, as clearly shown in Fig. 3. The operation of the valve will be readily appreciated, the expanding air lifting the ball valve 38 and escaping outwardly toward the tube 36. As the steam forms this will also escape until a sufficient oversupply of steam is generated, whereupon the ball 38 is forced to the top of the valve chamber 40 against the open inner end of the tube 36, thus closing the same, whereupon the boiling water in the receptacle 6 is forced upwardly into the upper receptacle 8. On removal of the heat, the ball 38 drops back onto its normal seat, preventing air from returning in the lower receptacle 6. Discontinuance or removal of the heat quickly cools the lower receptacle and the water which was driven upwardly flows backwardly into the lower member 6. Removal of the upper member 8 and washer 30 permits the coffee now contained within the receptacle 6 to be poured out for use.

Our invention is further described and defined in the form of claim as follows:

A percolator of the kind described, comprising a detachable coffee receptacle, a liquid receptacle, means connecting the two receptacles, including a pipe for the flow of liquid under pressure, and a passage permitting the escape of air and steam from the liquid receptacle, together with means automatically controlling the escape passage operated by an oversupply of steam.

In testimony whereof, we have signed our names to this specification.

GEORGE W. LOGGIE.
WILLIAM A. LAMB.